United States Patent Office 3,484,385
Patented Dec. 16, 1969

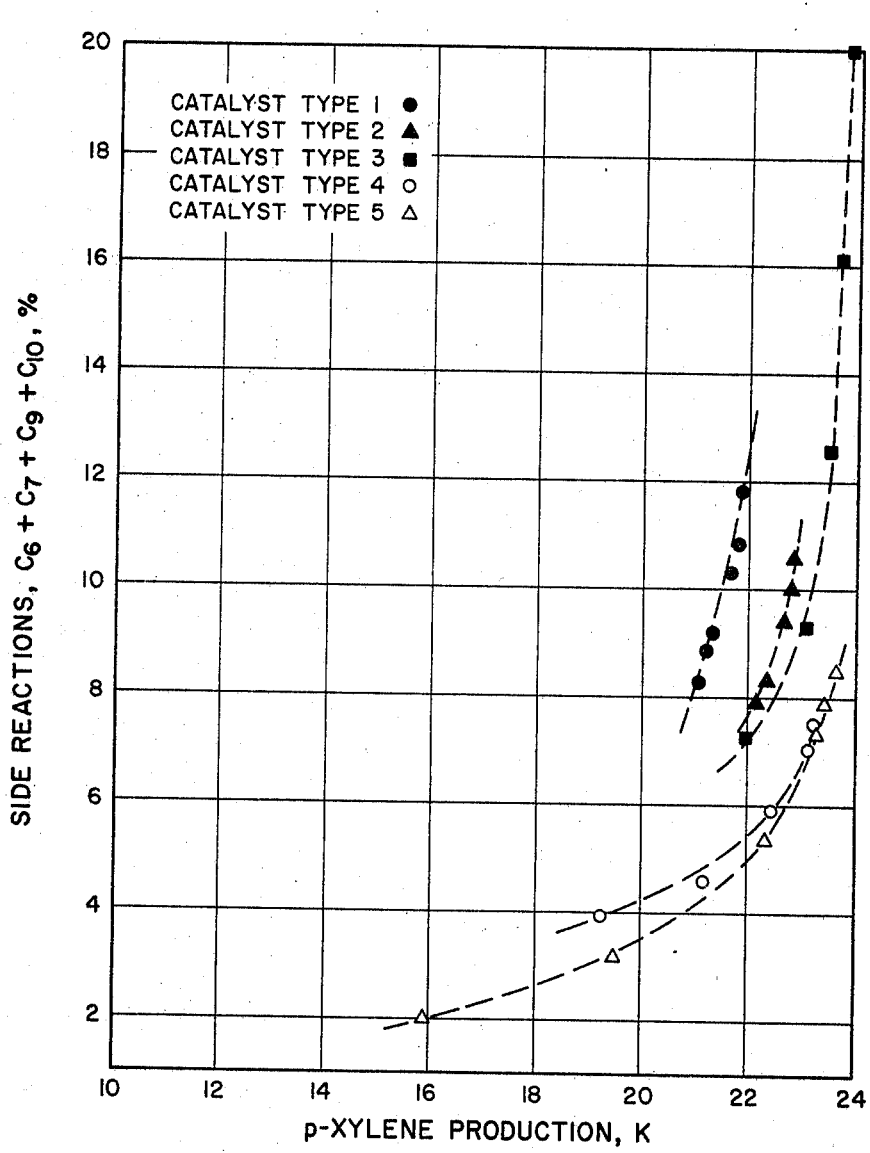

3,484,385
CATALYST FOR ISOMERIZATION OF POLYMETHYLBENZENE
Emanuel M. Amir, Baytown, Tex., assignor to Esso Research and Engineering Company
Filed Dec. 27, 1966, Ser. No. 604,789
Int. Cl. B01j 11/06, 11/44, 11/40
U.S. Cl. 252—455                                  14 Claims

ABSTRACT OF THE DISCLOSURE

Isomerization catalyst for polymethylbenzene formed by impregnating shapes of silica-alumina with soluble molybdenum compound and drying the impregnated shapes at a temperature below 650° F.

---

The present invention is directed to a catalyst for isomerization of polymethylbenzene. More particularly, the invention is concerned with a catalyst and a method of preparing the catalyst for isomerization of polymethylbenzene.

The present invention may be briefly described as a method for preparing a catalyst for isomerization of polymethylbenzene in which shapes of amorphous silica-alumina containing from about 20% to about 35% by weight of alumina and about 65% to about 80% by weight of silica are formed into shapes such as pellets or pills, and the like, followed by heating the shapes to a temperature below about 950° F. after which the shapes are impregnated at ambient temperature with an aqueous solution of a molybdenum compound to provide a finished catalyst containing from about 3% to about 10% molybdenum as $MoO_3$ on a dry basis. The impregnated shapes are then dried at a temperature below about 650° F. and preferably lower, and the so-formed catalyst may be then used in the isomerization of polymethylbenzene.

The temperature of the catalyst is adjusted to the desired isomerization temperature within the range from about 500° F. to about 800° F. and the catalyst at this temperature is contacted with a polymethylbenzene containing feed under isomerization conditions in the presence of hydrogen to form an isomerized product. The isomerization conditions include a pressure within the range from about 100 to about 500 p.s.i.g., a feed rate of about 0.1 to about 7 liquid v./v./hour and a hydrogen to feed mole ratio within the range from about 2:1 to about 20:1.

The shapes may be heated to a temperature below about 950° F. for a period of time within the range from about 1 to 24 hours. Preferably the heating should be conducted for about 3 to about 6 hours.

The impregnated shapes should be dried over a period of time within the range from about 1 to about 5 hours under the temperature conditions given.

Superatmospheric pressure at which the shaped silica-alumina molybdenum containing catalyst is heated may range from about 100 to about 500 p.s.i.g. A suitable pressure of about 250 p.s.i.g. may be used. These pressures may be maintained while the temperature of the catalyst is raised over the period of time given.

The step of heating the shapes to a temperature below about 950° F. may be omitted under some conditions where the shapes are formed without or in the absence of compaction and the shapes then impregnated without heating, following which the impregnated shapes are dried at a temperature below about 650° F. When the shapes are heated such as where extrusion, pilling, or compaction is used, the temperature must be maintained below about 950° F. within the preferred range from about 800° F. to about 900° F. Also, the impregnated shapes must be dried at a temperature below 650° (which may be within the range of about 250° F. to about 450° F.) but preferably the impregnated shapes are dried at a temperature below 325° F. within a lower, more preferred range of 225° F. to about 275° F. The shapes may be pellets or pills and may be formed by extrusion or by pelleting or by pressing.

The silica-alumina may be formed by co-precipitation or by mixing the separately precipitated silicic acid and aluminum hydroxide. Methods of forming synthetic amorphous silica-alumina are well known in the art.

In accordance with the present invention, it has been found that the efficiency of molybdenum containing silica-alumina catalyst in the isomerization of polymethylbenzenes is dependent on the method of preparation and especially the thermal history of the catalyst. Thus, it has been found that the isomerization of aromatic hydrocarbons such as the xylenes, the trimethylbenzenes and the tetramethylbenzenes, may be unexpectedly improved by the method of preparing the catalyst and the method of using the catalyst. It has been found that silica-alumina prepared either by co-precipitation or mixing of the separately precipitated silicic acid and aluminum hydroxide should be formed into shapes such as pills or extrusions and the like, following which the shapes such as pills may be heated to a temperature which must not exceed about 950° F. Thereafter, the heated shaped silica-alumina is impregnated with a solution of a soluble molybdenum compound such as ammonium molybdate or molybdic acid. Thereafter, the impregnated shapes are dried by heating to a temperature below about 650° F. As stated hereinafter, the heating of the shapes prior to impregnation may be omitted but when the heating operation is employed, the temperature may be within the preferred range from about 800° F. to about 900° F. The drying must be below about 650° F. and may be within the range of about 225° F. to about 650° F., more preferably in the range of 225° F. and about 275° F. Where using catalysts containing silica in an amount of about 65% to 80% by weight and about 20% to 35% by weight of alumina, very desirable results are obtained in this procedure.

The invention will be further illustrated by the following operations on five different types of catalyst which were prepared as described below:

TYPE 1

The dried powdered silica-alumina, containing about 28% alumina (on water-free basis) and about 14% moisture, is impregnated with a solution of ammonium heptamolybdate and dried. The impregnated powder was formed into cylinders ⅛″ diameter x ¼″ long. The formed pellets were heated for three hours at 1100° F.

TYPE 2

This catalyst was prepared from the same powdered silica-alumina, but was formed into pellets before impregnation. The pellets were heated for three hours at 1100° F., then impregnated with ammonium heptamolybdate and dried. It was again heated for three hours at 1100° F.

TYPE 3

The catalyst was prepared in a manner similar to Type 2, except that it was heated after impregnation for three hours at 250° F.

TYPE 4

This catalyst was prepared in a manner similar to Type 3, but was heated at 850° F. for three hours before impregnation. The impregnated catalyst was also dried for three hours at 250° F.

TYPE 5

This catalyst was prepared in a manner similar to Type 3, but it was not heated at all after forming. After impregnation the catalyst was also dried for three hours at 250° F.

All five types of catalyst contained about 5% molybdenum calculated as $MoO_3$. The several types of catalyst were tested for their ability to isomerize a mixture of $C_8$ aromatic hydrocarbons under the following conditions:

TABLE I

| | |
|---|---|
| Temperature °F | 750–840 |
| Pressure p.s.i.g | 230–250 |
| Feed rate v. (liq.)/v. cat./hr | 0.9–1.6 |
| $H_2$: feed rate mole/mole feed | 6.5–8.6 |

The mixture of $C_8$ aromatic hydrocarbons had a composition as given in Table II:

TABLE II

| | Wt. percent |
|---|---|
| Non aromatics | 0.21 |
| Benzene | 0.01 |
| Toluene | 0.11 |
| Ethylbenzene | 11.38 |
| p-Xylene | 9.03 |
| m-Xylene | 45.41 |
| o-Xylene | 32.95 |
| $C_9$ aromatics | 0.90 |
| $C_{10}$ aromatics | 0.00 |

The performance of these several catalysts was judged on the ability of the catalyst to produce paraxylene under the conditions of Table I and the extent of side reactions as measured by the increase in the total amount of benzene, toluene, $C_9$ and $C_{10}$ aromatic hydrocarbons in the product.

The catalysts, before using, were crushed and sieved to a 10–20 mesh size and employed in a 1″ by 12″ stainless steel reactor.

A large number of runs was made under different conditions but within the ranges given in Table I. Some of the runs were of a duration of 100 hours with others extending for periods as long as 2,000 hours. As the runs progressed, the compositions of the products changed with time as might be expected. It was found, however, that the most illustrative and comprehensive method of correlating the results was to plot the extent of paraxylene production against the side reactions of the products. The extent of paraxylene production was, therefore, calculated from the data obtained from the products from the following relationship:

$$\text{Extent of p-xylene production} = K = \frac{\text{percent p-xylene}}{\text{percent p-xylene} + \text{percent m-xylene} + \text{percent o-xylene}}$$

Thus, K has a maximum value (thermodynamic equilibrium) of about 24 at the temperatures employed in Table I.

By reference to a single figure of the drawing wherein the results obtained with the different catalysts and types mentioned before are shown, it will be noted that Types 4 and 5 are superior to the other three types, Type 5 being somewhat better than catalyst Type 4 since Types 4 and 5 give much less side reactions at the same K values than the other three catalyst types.

The isomerization of trimethylbenzene is illustrated in the following example where 1,2,4-trimethylbenzene is isomerized to the equilibrium mixture of the 3 isomeric trimethylbenzenes. The feed and products compositions are given in Table III.

TABLE III.—TRIMETHYLBENZENES

| | Feed, wt. percent | Products wt. percent |
|---|---|---|
| Non aromatics | 0.09 | 1.83 |
| Benzene | 0.09 | 1.83 |
| Toluene | 0.09 | 1.83 |
| $C_8$ aromatics | 0.14 | 8.29 |
| Ethyltoluene | 0.92 | 0.82 |
| 1,3,5-trimethylbenzene | 3.29 | 22.09 |
| 1,2,4-trimethylbenzene | 90.42 | 50.47 |
| 1,2,3-trimethylbenzene | 1.95 | 6.44 |
| $C_{10}$ aromatics | 3.24 | 10.05 |

The relative concentrations of these trimethylbenzene are at the thermodynamic equilibrium as calculated from literature data.

The isomerization was carried out at the conditions given in Table IV.

TABLE IV

| | |
|---|---|
| Catalyst | Type 4 |
| Temperature °F | 625 |
| Feed rate v./v./hr | 1.66 |
| Pressure | 250 |
| $H_2$ to feed ratio mole | 6.8 |

The isomerization of tetramethylbenzene can be carried out at even lower temperatures. Substantially equilibrium concentrations were obtained at 570° F. using the same catalyst and other reaction conditions.

The nature and objects of the present invention having been fully described and illustrated, and the best mode and embodiment contemplated set forth, what I wish to claim as new and useful and secure by Letters Patent is:

1. A method of preparing a catalyst for isomerization of polymethylbenzene which comprises the steps of:
   forming shapes of silica-alumina containing from about 20% to about 35% by weight of alumina and about 65% to about 80% by weight of silica;
   impregnating said shapes at ambient temperature with an aqueous solution of a soluble molybdenum compound to provide a finished catalyst containing from about 3 to about 10% molybdenum as $MoO_3$ on a dry basis; and
   drying said impregnated shapes at a temperature below about 650° F. for a time within the range from about 1 to about 5 hours.

2. A method in accordance with claim 1 in which the shapes are pellets.

3. A method in accordance with claim 1 in which the shapes are pills.

4. A method in accordance with claim 1 in which the shapes are formed by extrusion.

5. A method in accordance with claim 1 in which the shapes are formed by pressing.

6. A method in accordance with claim 1 in which the shapes are formed by compaction and then heated to a temperature below about 950° F. before the shapes are impregnated.

7. A method in accordance with claim 6 in which:
   (a) the shapes are heated to a temperature within the range of about 800° F. to about 900° F.; and
   (b) the impregnated shapes are dried at a temperature within the range of about 225° F. to about 450° F.

8. A method in accordance with claim 7 in which the impregnated shapes are dried at a temperature within the range of about 225° F. to about 275° F.

9. A method in accordance with claim 1 in which the soluble molybdenum compound is ammonium molybdate.

10. A method in accordance with claim 1 in which the catalyst comprises about 6% $MoO_3$ on 75% silica and 25% alumina.

11. A catalyst prepared in accordance with claim 1.

12. A method of preparing a catalyst for isomerization of polymethylbenzene which comprises:

forming shapes of silica-alumina containing about 65% to 80% and about 20% to 35% by weight, respectively, of silica and alumina;

impregnating said shapes with an aqueous solution of a soluble molybdenum compound to provide a finished catalyst containing an isomerization effective amount of $MoO_3$ on a dry basis; and drying said shapes at a temperature below about 650° F. for at least about 1 hour.

13. A method of preparing a catalyst for isomerization of polymethylbenzene which comprises:

impregnating a formed and shaped silica-alumina, said shapes containing an effective major amount of silica, with an aqueous solution of a soluble molybdenum compound to provide a finished catalyst containing an isomerization-effective amount of $MoO_3$ on a dry basis; and drying said formed and impregnated catalyst at a temperature below 650° F. for at least about 1 hour.

14. A method in accordance with claim 12 in which the finished catalyst contains from about 3 to about 10% molybdenum as $MoO_3$.

References Cited

UNITED STATES PATENTS

| | | |
|---|---|---|
| 2,818,451 | 12/1957 | Myers. |
| 2,988,575 | 6/1961 | Hays et al. |
| 3,119,886 | 1/1964 | Smeykal et al. ____ 252—458 X |

DANIEL E. WYMAN, Primary Examiner

C. F. DEES, Assistant Examiner

U.S. Cl. X.R.

252—458; 260—668